(12) United States Patent
Davis

(10) Patent No.: US 8,240,246 B2
(45) Date of Patent: Aug. 14, 2012

(54) REMOVABLE TOASTER BASKET WITH HANDLE

(76) Inventor: Rick Davis, Battle Creek, MI (US)

( * ) Notice: Subject to any disclaimer, the term of this patent is extended or adjusted under 35 U.S.C. 154(b) by 705 days.

(21) Appl. No.: 12/455,362

(22) Filed: May 30, 2009

(65) Prior Publication Data

US 2009/0293737 A1    Dec. 3, 2009

Related U.S. Application Data

(60) Provisional application No. 61/057,930, filed on Jun. 2, 2008.

(51) Int. Cl.
 *A47J 37/06* (2006.01)
(52) U.S. Cl. ........... 99/392; 99/391; 99/393; 99/394; 99/399; 99/402; 99/426
(58) Field of Classification Search ........... 99/392, 99/391, 394, 393, 399, 402, 426
See application file for complete search history.

(56) References Cited

U.S. PATENT DOCUMENTS

| 2,382,380 | A | * | 8/1945 | Buttner | 99/427 |
|---|---|---|---|---|---|
| 2,849,947 | A | * | 9/1958 | Bork | 99/402 |
| 2,962,957 | A | * | 12/1960 | Bork | 99/402 |
| 3,046,870 | A | * | 7/1962 | Bork | 99/402 |
| 3,094,061 | A | * | 6/1963 | Cole | 99/402 |
| 3,140,651 | A | * | 7/1964 | Barnett | 99/339 |
| 3,511,170 | A | * | 5/1970 | O'Connor | 99/402 |
| 4,129,067 | A | * | 12/1978 | Reiland | 99/391 |
| 4,184,419 | A | * | 1/1980 | Ponte | 99/402 |
| 4,290,349 | A | * | 9/1981 | Fiorenza | 99/388 |
| 4,656,927 | A | * | 4/1987 | Mosby et al. | 99/388 |
| 5,853,781 | A | * | 12/1998 | Bono et al. | 426/110 |
| 2009/0049993 | A1 | * | 2/2009 | Morgan | 99/375 |

* cited by examiner

*Primary Examiner* — Benjamin Layno
(74) *Attorney, Agent, or Firm* — Robert M. Downey, P.A.

(57) ABSTRACT

A removable toaster basket assembly to be removably received in a toasting slot of an electric pop-up toaster facilitates inserting and removing food articles in the toasting slot for toasting of the food article. The removable toaster basket assembly includes an elongate substantially planar frame for resting on an upper surface of the toaster and defines a rectangular slot therethrough. A handle extends from one end of the frame. An elongate basket is slidably received in the slot, the basket having ends and sides which define an open top for receiving a food article. A stop on the basket limits translation of the basket with respect to said frame to maintain the basket captive within the frame.

20 Claims, 2 Drawing Sheets

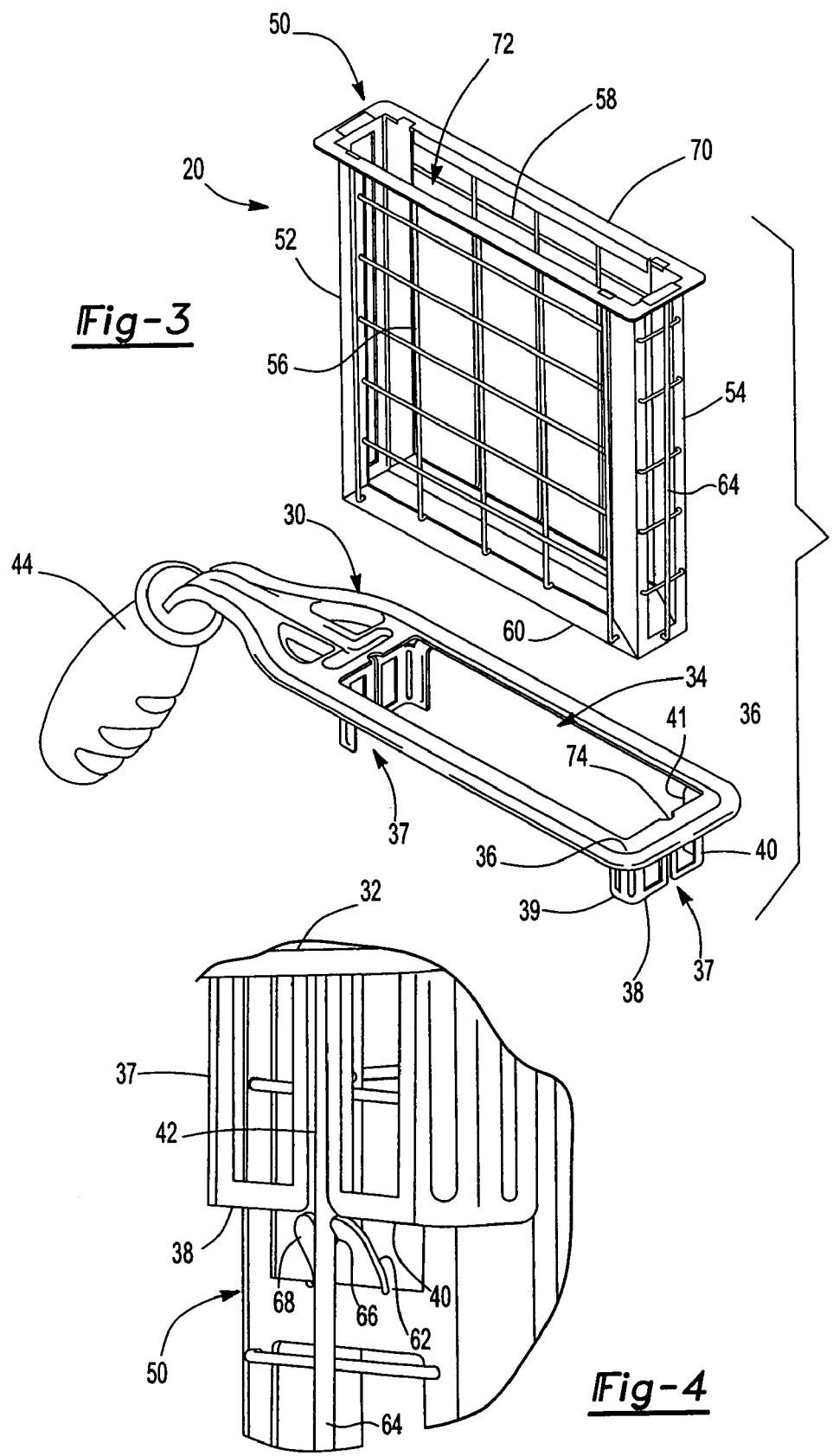

REMOVABLE TOASTER BASKET WITH HANDLE

CROSS REFERENCE TO RELATED APPLICATIONS

This application claims the benefit of U.S. Provisional Patent Application Ser. No. 61/057,930, filed Jun. 2, 2008.

BACKGROUND OF THE INVENTION

1. Field of the Invention

The present invention relates to pop-up toasters in general and more specifically to a removable basket for inserting and removing food articles in the slot of a pop-up toaster.

2. Discussion of the Related Art

A toaster is typically a small electric kitchen appliance designed to toast or heat multiple types of bread, pastry products or bagels. A typical modern two-slice toaster has two slots in which the bread, pastry slices or bagel half are placed. Generally, a toaster draws anywhere between 600 and 1200 Watts of power and completes the heating or toasting cycle in 1 to 3 minutes.

In pop-up or automatic toasters, food articles are inserted vertically into the slots (generally only large enough to admit such food articles as a single slice of bread, a single pastry or half of a bagel) on the top of the toaster. A lever on the side of the toaster is depressed, whereupon the food articles to be heated or toasted are lowered between a pair of heating elements and thereby activating the toaster. When an internal device determines that the toasting or heating cycle is complete, the toaster turns off and the lowering mechanism pops the food articles up out of the slots. The heating elements of a pop-up toaster are usually oriented vertically, parallel to the article of food—although there are some variations.

Sometimes the food articles being toasted get stuck in a toaster by catching on part of the various wire grids and lips of the toaster structure. Also, some food articles placed in a toaster are small with respect to the depth of the slot in which the toasting takes place. Thus, when the toasting is complete and the lowering mechanism releases and pops up, the food article remains out of reach of the fingers of the individual operating the toaster. This is most prevalent in pop-up toasters, and the food article must then be freed manually. Further, when the food article pops up, its temperature is elevated and may be too hot for some individuals to grasp.

As most toasters are used in the kitchen, metal knives and forks are typically an easily available tool to assist in the extraction of the food article from the toaster slot. The internal structure of the toaster is primarily of metal construction and the heating elements are of a composition that heats through electrical resistance. Therefore, utilization of metal devices such as forks and knives to extract food articles from the toaster presents a significant risk of electric shock to the user, unless the appliance is disconnected from the main electrical outlet.

Thus what is desired is a device to aid in the extraction of food articles from a pop-up toaster without endangering the user to electrical shock or suffering burns from grasping hot food articles with the user's bare fingers.

SUMMARY OF THE INVENTION

The present invention is directed to a removable toaster basket that facilitates the insertion and removal of food articles in a toasting slot of a toaster. The removable toaster basket assembly includes an elongate substantially planar frame for resting on an upper surface of the toaster and defines a rectangular slot therethrough. A handle extends from one end of the frame. An elongate basket is received in rectangular slot and is slidable therein in a direction substantially perpendicular to the planar frame. The basket has first and second ends, sides, and a bottom wherein the ends and sides define an open top for receiving a food article. At least a first stop is positioned on the basket for limiting translation of the basket in a first direction with respect to the frame to maintain the basket captive within the frame.

Another aspect of the present invention is a removable toaster basket assembly to be removably received in a toasting slot of an electric pop-up toaster thus facilitating inserting and removing food articles in the toasting slot. The removable toaster basket assembly has an elongate substantially planar frame for resting on an upper surface of the toaster and defines a rectangular slot therethrough. A handle extends from one end of the frame. An elongate basket is received in the rectangular slot and is slidable therein in a direction substantially perpendicular to the planar frame. The basket has first and second ends, sides, and a bottom wherein the ends and sides define an open top for receiving a food article. At least a first guide extends downwardly from the frame at an end of the rectangular slot and includes first and second tab segments at adjacent end corners of the rectangular slot. The tab segments define a vertical notch therebetween in which is received a portion of the basket to guide the basket during translation within the frame. At least a first stop is positioned on the basket for limiting translation of the basket in a first direction with respect to the frame to maintain the basket captive within the frame.

Yet another aspect of the present invention is a removable toaster basket assembly to be removably received in a toasting slot of an electric pop-up toaster for inserting and removing food articles for toasting of the food article. The basket assembly includes an elongate substantially planar frame for resting on an upper surface of the toaster and defines a rectangular slot therethrough. A handle extends from one end of the frame. An elongate basket is received in the rectangular slot and is translateably slidable therein in a direction substantially perpendicular to the planar frame. The basket has first and second ends, sides, and a bottom wherein the ends and sides form an outwardly extending lip. The lip further defines an open top of the basket for receiving a food article. A vertical guide wire is positioned at each end of the elongate basket. A guide extends downwardly from the frame at each end of the rectangular slot and includes first and second tab segments at adjacent end corners of the rectangular slot. The tabs define a vertical notch therebetween and receive one of the guide wires to guide the basket during translation of the basket with respect to the frame. A stop is positioned on each end of the basket and is engagable with a respective one of the guides for limiting translation of the basket in a first direction to maintain the basket captive within the frame.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the following detailed description taken in conjunction with the accompanying drawings in which:

FIG. 3 is an exploded view of the removable toaster basket of FIG. 2;

FIG. 4 is an enlarged segmental view of the guide and stop.

Like reference numerals refer to like parts throughout the several views of the drawings.

DETAILED DESCRIPTION OF THE PREFERRED EMBODIMENTS

Figure 2:
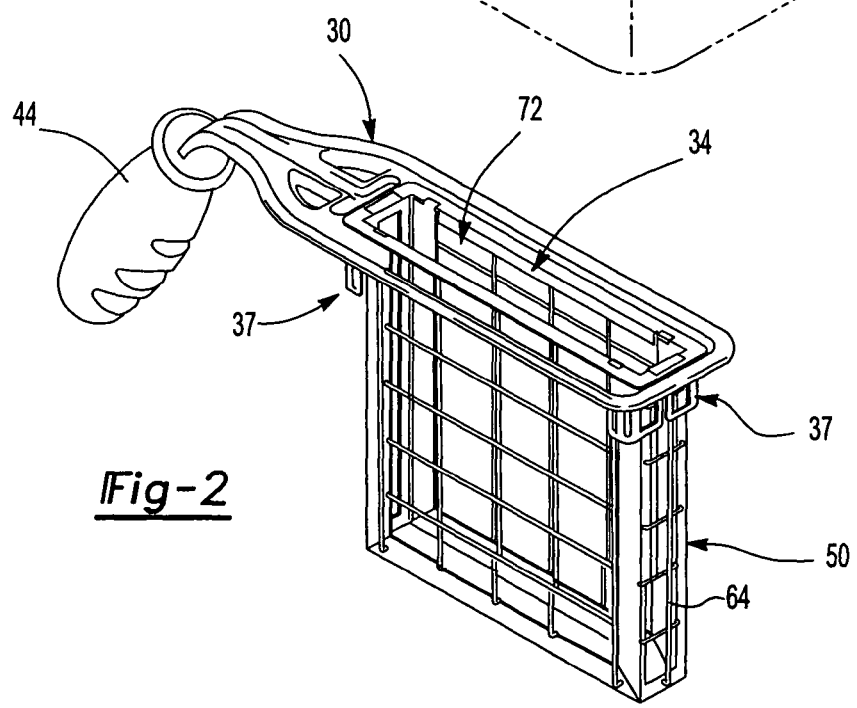
FIG. 2 is a perspective view of the removable toaster basket.

For purposes of description herein, the terms "upper", "lower", "left", "rear", "right", "front", "vertical", "horizontal", and derivatives thereof shall relate to the invention as oriented in FIG. 2. However, one will understand that the invention may assume various alternative orientations and step sequences, except where expressly specified to the contrary. While the present invention has been shown and described in accordance with preferred and practical embodiments thereof, one will also recognize that departures from the instant disclosure are fully contemplated within the spirit and scope of the invention. Hence, specific dimensions and other physical characteristics relating to the embodiments disclosed herein are not to be considered as limiting, unless the claims expressly state otherwise.

Turning to the drawings, FIG. 2-3 show a removable toaster basket assembly 20 which is one of the preferred embodiments of the present invention and illustrates its various components.

Figure 1:
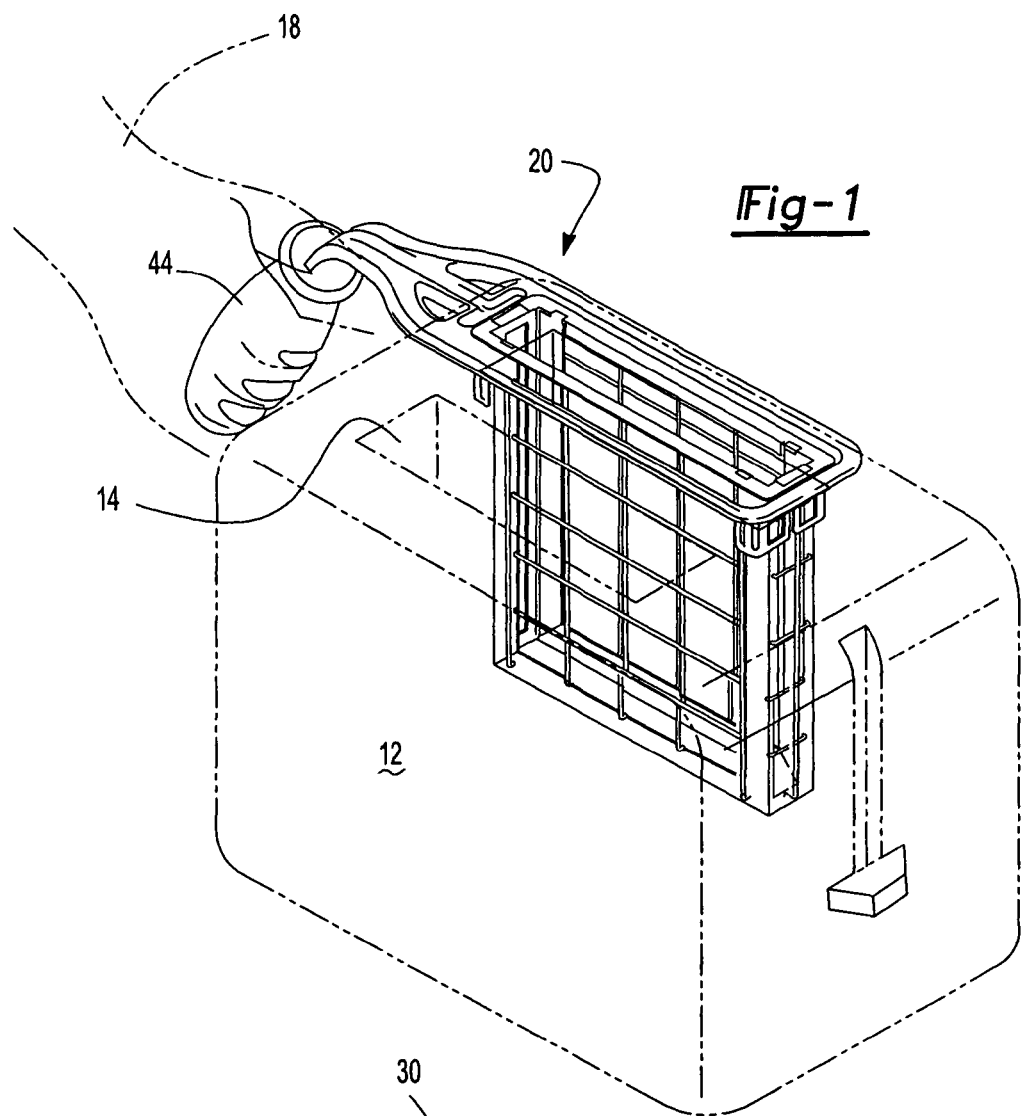
FIG. 1 is a perspective view of the removable toaster basket embodying the present invention illustrating its insertion into a toasting slot of a toaster.

Removable toaster basket assembly 20 has an elongate basket 50 whose width, length, and depth generally correspond to the internal size of a toasting slot 14 of an electric pop-up toaster 12 (FIG. 1). For example, the non-limiting size of one such basket 50 can be 1.25 inches wide, 5.25 inches long, and 6.0 inches deep. However, other basket sizes are contemplated and can be fabricated for use in toasters 12 having differently sized toasting slots 14.

Basket assembly 50 includes first and second ends 52, 54, sides 56, 58 and bottom 60. Ends 52, 54 and sides 56, 58 define an elongate open top 72. An outwardly extending lip 70 surrounds and further defines open top 72. When basket 50 is inserted in toasting slot 14, sides 56, 58 are necessarily interposed between the food article to be toasted and the heating elements within toasting slot 14. Therefore, sides 56, 58 are configured as a coarse mesh or wire lattice that is thermally resistant yet provides sufficient transmission of thermal energy therethrough for the efficient toasting of the food article in basket 50. Ends 52, 54 can be of similar construction as sides 56, 58, or alternatively can be of solid construction. One or both ends 56, 58 can include a vertical guide wire 64 affixed externally thereto.

Bottom 60 is preferably of solid construction. A solid construction of bottom 60 will trap crumbs that are necessarily produced during the toasting process. These crumbs are readily removed and discardable when basket 50 is removed from toasting slot 14 rather than left to accumulate in the bottom of toaster 12.

Removable toaster basket assembly 20 further includes a frame assembly 30 slidably supporting basket assembly 50. Frame assembly 30 has a generally elongate planar frame 32 fabricated from a heat resistant material such as metal, ceramic, or a heat resistant resin. A handle 44 extends from one end of frame 32 and may be contoured and angled to facilitate easy grasping by a user's hand 18 (FIG. 1). Frame 30 defines a rectangular slot 34 therethrough receiving basket 50 and has at least one guide 37 extending downwardly therefrom at one end of slot 34. Most preferably, frame assembly 30 includes a guide 37 extending downwardly at each end of slot 34.

Each guide 37, as most clearly illustrated in FIGS. 3-4, includes adjacent tab segments 38, 40. Tab segments 38, 40 are positioned at adjacent end corners 36 of rectangular slot 34 and extend downwardly from frame 32. Adjacent tab segments 38, 40 define a vertical notch 42 therebetween for receiving vertical guide wire 64 of basket 50 and are of sufficient length to maintain basket 50 in an orientation substantially perpendicular to planar frame 32 during translation of basket 50 within frame 32. Tab segments 38, 40 can further have projecting perpendicularly therefrom, legs 39, 41 respectively. Legs 39, 41 extend partially along a respective adjacent side of slot 34. Frame 32 also defines at each end of slot 34 a recess 74 sized to accept the passage of guide wire 64. Recess 74 facilitates frame 32 to more closely receive ends 52, 54 of basket 50 within slot 34.

Alternatively, guide 37 can be formed as a single downwardly extending tab (not shown) defining a notch at an end therein which in combination with recess 74 is the functional equivalent of vertical notch 42 for engaging guide wire 64. The single tab at an end of slot 34 can further include legs at each side thereof which are formed at right angles to functionally correspond to legs 39, 41.

As illustrated in FIG. 4, at least a first stop 62 is located at an intermediate vertical position on at least one of ends 52, 54. Most preferably a stop 62 is located on both ends 52, 54 of basket 50. Stop 62 projects from ends 52, 54 such that an end 68 thereof engages or abuts tab segments 38, 40 of guide 37 when basket 50 is vertically raised with respect to frame 32. Stop 62 is vertically positioned along ends 52, 54 to permit basket 50 to vertically translate within slot 34 of frame 32, but not disengage from frame 32 when toaster basket assembly 20 is inverted. The vertical positioning of stop 62 is also such as to permit sufficient vertical translation of basket 50 to allow the pop-up mechanism of toaster 12 to substantially fully extend when the toasting cycle has been completed. In a most preferred configuration, stop 62 is centrally positioned on ends 52, 54 and defines a notch 66 which receives guide wire 64 therein.

A trigger and catch mechanism (not shown) can also be incorporated to selectively maintain basket 50 in a fixed position with respect to frame 32 and to release basket 50 from the fixed position. The trigger mechanism can also be utilized to lock and unlock basket 50 while holding back, in toasters so equipped, the vertically oriented spring grids that are biased against and close on the food article when the pop-up mechanism is depressed.

In use, and again referring to FIGS. 1-4, a user can grasp handle 44 of removable toaster basket assembly 20 with a hand 18 and insert a food article desired to be heated or toasted into basket 50 through open top 34. Lip 70 rests on an upper surface of frame 32 to support basket 50 therein. Toaster basket assembly 20 is then positioned over one of toasting slots 14 of pop-up toaster 12 and vertically lowered such as to insert the lower portion of basket 50 in the chosen toasting slot 14. Toaster basket assembly 20 is lowered until bottom 60 of basket 50 contacts the pop-up mechanism of toaster 12 at which time basket 50 is vertically supported by the pop-up mechanism. Frame assembly 30 is continued to be lowered such that guides 37 are at least partially inserted into toasting slot 14 and frame 32 rests on an upper surface of toaster 12.

In addition to stabilizing and guiding basket 50 during translation within frame 32, guides 37 further function to properly orient removable toaster basket assembly 20 within toasting slot 14. Many toasters also include vertically oriented spring grids that are biased against and close on the food article when the pop-up mechanism is depressed, thereby holding the food article midway between both heating elements in toasting slot 14. Legs 39, 41 of guides 37 vertically extend sufficiently far into toasting slot 14 such that when the pop-up mechanism is depressed, the grids abut against legs 39, 41 and do not touch basket 50.

When the toasting cycle completes, the pop-up mechanism is automatically released and raises basket 50 with respect to frame assembly 30 while frame assembly 30 remains in a resting position on the top of toaster 12. The user can then remove the food article from basket 50 while leaving removable toaster basket assembly 20 engaged within toaster 12, or more preferably, to again grasp handle 44, raise frame assembly 30 from toaster 12 such that frame 32 engages lip 70 of basket 50 and extract basket 50 from toasting slot 14. The user can then selectively position toaster basket assembly 20 over a plate and upend basket 50 to allow the food article therein to slide through open top 34 onto the plate. In this manner, the hot food article does not need to be touched by bare fingers or require the use of a metal utensil to extract the food article from toaster 12 and subject the user to potential burns or electrical shock.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A removable toaster basket assembly to be removably received in a toasting slot of an electric pop-up toaster for inserting and removing food articles in the toasting slot for toasting of the food article, said removable toaster basket assembly comprising:
    an elongate substantially planar frame for resting on an upper surface of the toaster, said frame defining a rectangular slot therethrough;
    a handle extending from one end of said frame;
    an elongate basket received in said slot and slidable therein in a direction substantially perpendicular to said planar frame, said basket having first and second ends, sides, and a bottom, said ends and sides defining an open top for receiving a food article; and
    at least a first stop on said basket for limiting translation of said basket in a first direction with respect to said frame to maintain said basket captive within said frame.

2. The removable toaster basket assembly according to claim 1 further including a guide to maintain said basket substantially perpendicular to said planar frame.

3. The removable toaster basket assembly according to claim 2 wherein said guide includes a tab at one end of said frame and extending below said frame, said tab defining a notch therein, and further wherein said basket includes a guide wire, said guide wire slidably received in said notch.

4. The removable toaster basket assembly according to claim 3 wherein said first stop is positioned on said basket and engagable with said guide to maintain said basket captive within said frame.

5. The removable toaster basket assembly according to claim 4 wherein said elongate basket forms an outwardly extending lip surrounding said open top, said lip supporting said basket on said frame within said rectangular slot when oriented in an upright position and for limiting translation of said basket in a second direction.

6. The removable toaster basket assembly according to claim 2 wherein said guide includes a tab affixed to said frame at each end of said rectangular slot, each said tab extending below said frame and defining a notch therein, and further wherein said basket includes a guide wire at each end thereof, each said guide wire slidably received in one of said notches to maintain said basket substantially perpendicular to said planar frame.

7. The removable toaster basket assembly according to claim 6 wherein said first stop is positioned on said basket and engagable with said guide to maintain said basket captive within said frame.

8. The removable toaster basket assembly according to claim 7 wherein said elongate basket forms an outwardly extending lip surrounding said open top, said lip supporting said basket on said frame within said rectangular slot when oriented in an upright position and for limiting translation of said basket in a second direction.

9. The removable toaster basket assembly according to claim 1 wherein each side of said basket is constructed as a porous lattice to allow thermal energy from toaster heating elements to pass therethrough.

10. The removable toaster basket assembly according to claim 1 wherein each said end of said basket is of solid construction.

11. The removable toaster basket assembly according to claim 1 wherein said bottom of said basket is of solid construction.

12. A removable toaster basket assembly to be removably received in a toasting slot of an electric pop-up toaster for inserting and removing food articles in the toasting slot for toasting of the food article, said removable toaster basket assembly comprising:
    an elongate substantially planar frame for resting on an upper surface of the toaster, said frame defining a rectangular slot therethrough;
    a handle extending from one end of said frame;
    an elongate basket received in said slot and slidable therein in a direction substantially perpendicular to said planar frame, said basket having first and second ends, sides, and a bottom, said ends and sides defining an open top for receiving a food article;
    at least a first guide extending downwardly from said frame at an end of said rectangular slot, said guide including first and second tab segments at adjacent end corners of said rectangular slot, said tabs defining a vertical notch therebetween, said vertical notch receiving a portion of said basket therein to guide said basket during translation of said basket with respect to said frame;
    at least a first stop on said basket for limiting translation of said basket in a first direction with respect to said frame to maintain said basket captive within said frame.

13. The removable toaster basket assembly according to claim 12 wherein said elongate basket forms an outwardly extending lip surrounding said open top, said lip supporting said basket on said frame when oriented in an upright position and for limiting translation of said basket in a second direction.

14. The removable toaster basket assembly according to claim 13 wherein said guiding portion of said basket is a guide wire positioned at an end of said basket in engagable registration with said vertical notch.

15. The removable toaster basket assembly according to claim 14 wherein each said first and second tab segments have projecting therefrom a leg extending partially along an adjacent side of said rectangular slot.

16. The removable toaster basket assembly according to claim 13 further including a second guide extending downwardly from said frame at an opposite end of said rectangular slot, said second guide including first and second tab segments at adjacent end corners of said rectangular slot, said tab segments defining a vertical notch therebetween, said vertical notch receiving a second guide wire of said basket therein to guide said basket during translation of said basket with respect to said frame.

17. The removable toaster basket assembly according to claim 16 wherein each said first and second tab segments of said second guide have projecting therefrom a leg extending partially along an adjacent side of said rectangular slot.

18. The removable toaster basket assembly according to claim 12 wherein each side of said basket is constructed as a porous lattice to allow thermal energy from toaster heating elements to pass therethrough.

19. The removable toaster basket assembly according to claim 12 wherein said bottom of said basket is of solid construction.

20. A removable toaster basket assembly to be removably received in a toasting slot of an electric pop-up toaster for inserting and removing food articles in the toasting slot for toasting of the food article, said removable toaster basket assembly comprising:
  an elongate substantially planar frame for resting on an upper surface of the toaster, said frame defining a rectangular slot therethrough;
  a handle extending from one end of said frame;
  an elongate basket received in said slot and translateably slidable therein in a direction substantially perpendicular to said planar frame, said basket having first and second ends, sides, and a bottom, said ends and sides forming an outwardly extending lip, said lip defining an open top of said basket for receiving a food article therein;
  a vertical guide wire positioned at each end of said elongate basket;
  a guide extending downwardly from said frame at each end of said rectangular slot, each said guide including first and second tab segments at adjacent end corners of said rectangular slot, said tabs defining a vertical notch therebetween, each said vertical notch receiving one of said guide wires therein to guide said basket during translation of said basket with respect to said frame;
  a stop on each said end of said basket, each said stop engagable with a respective one of said guides for limiting translation of said basket in a first direction with respect to said frame to maintain said basket captive within said frame.

* * * * *